US005447777A

United States Patent [19]

Taguma

[11] Patent Number: 5,447,777

[45] Date of Patent: Sep. 5, 1995

[54] DECORATIVE PAPER AND IMPREGNATED PAPER

[75] Inventor: Hiroaki Taguma, Tokyo, Japan

[73] Assignee: Chiyoda Gravure Printing Co., Ltd., Japan

[21] Appl. No.: 843,953

[22] Filed: Feb. 28, 1992

[30] Foreign Application Priority Data

Feb. 28, 1991 [JP] Japan .................................. 3-055720

[51] Int. Cl.[6] ................................................ B32B 3/00

[52] U.S. Cl. .................................... 428/195; 428/211; 428/411.1; 428/507; 428/526; 428/542.2; 428/543

[58] Field of Search ............ 428/195, 203, 211, 411.1, 428/507, 526, 542.2, 543; 156/277, 280; 427/258, 261

[56] References Cited

U.S. PATENT DOCUMENTS 4,971,854 11/1990 Hinishi et al. ........................ 428/195
5,019,202 5/1991 Kawahata et al. .................. 428/203

*Primary Examiner*—Patrick J. Ryan
*Assistant Examiner*—William Krynski
*Attorney, Agent, or Firm*—Graham & James

[57] ABSTRACT

The present invention relates to a decorative paper with high abrasion resistance. The present invention provides a thin film containing a thermosetting resin hardener on a sheet of decorative paper. The decorative paper is then impregnated with thermosetting resin. In the press process to manufacture a decorative board, since the thermosetting resin around the printed layer hardens faster than the resin of the raw paper, the resin on the surface is not absorbed and forms a thick hardened film. This provides a decorative board of excellent surface properties including high abrasion resistance.

2 Claims, 6 Drawing Sheets

FIG. 1(a)
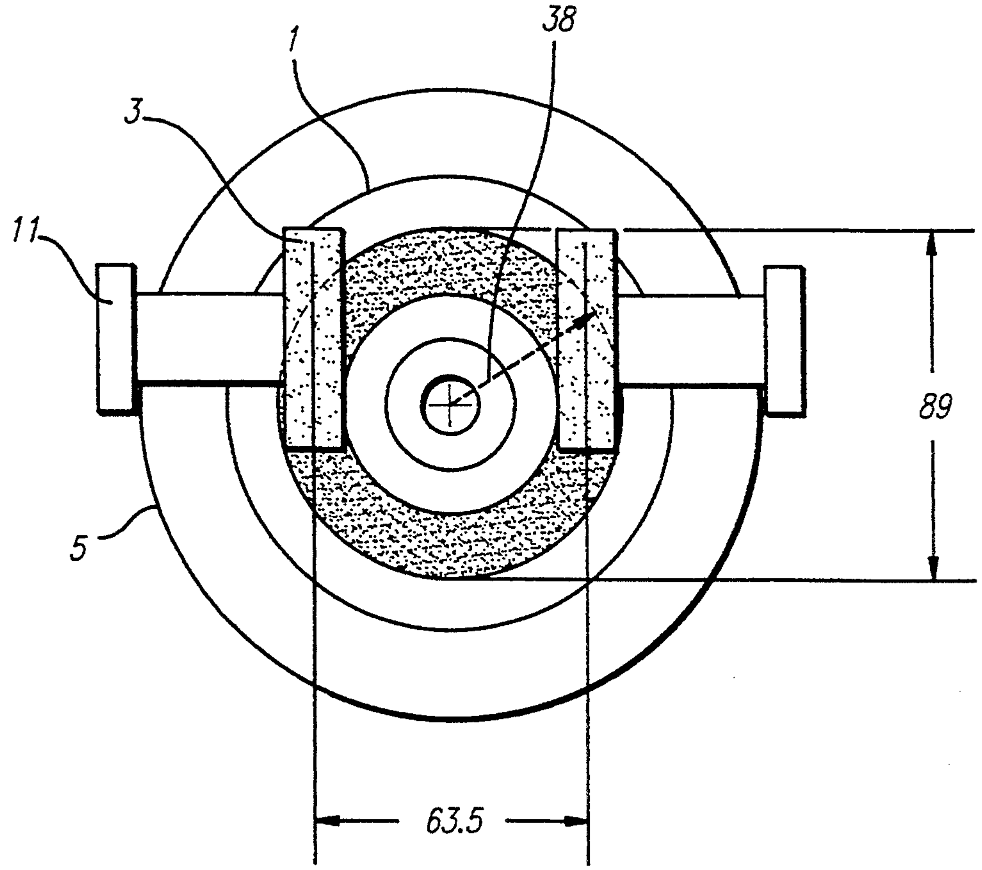
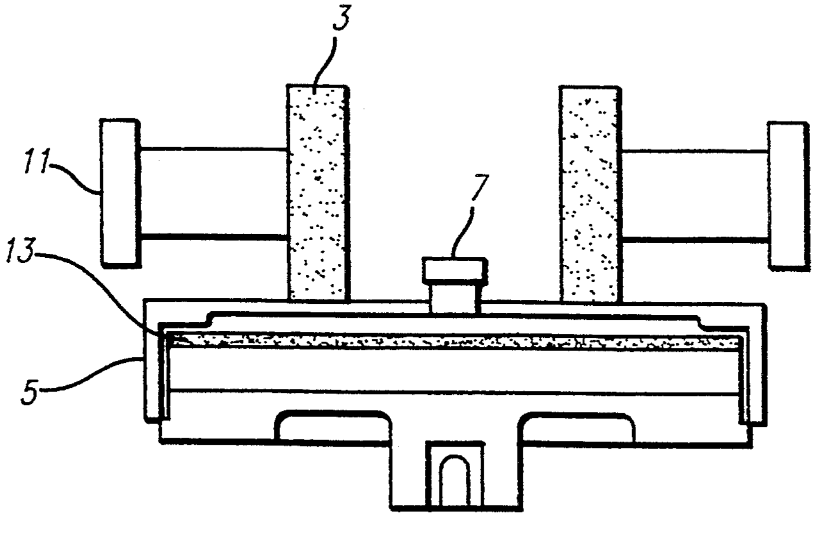
FIG. 1(b)

FIG. 2(a)
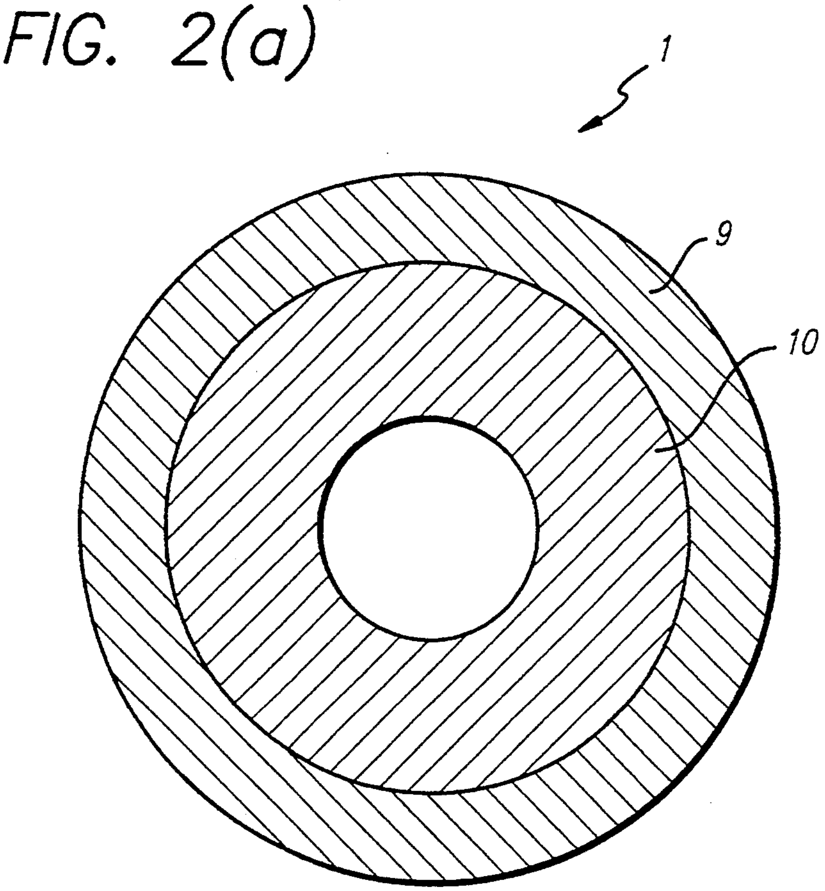
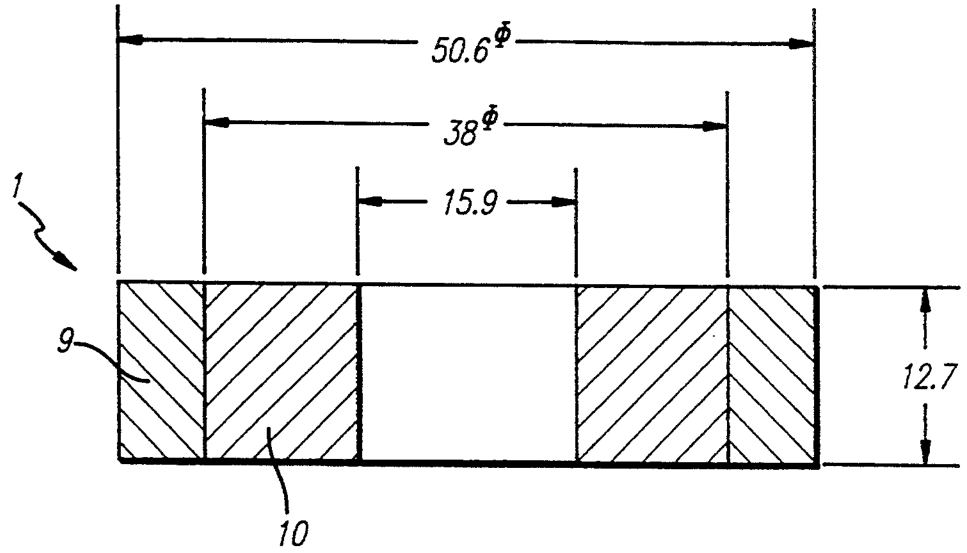
FIG. 2(b)

DECORATIVE PAPER AND IMPREGNATED PAPER

BACKGROUND OF THE INVENTION a) Field of the Invention

The present invention generally relates to decorative papers and impregnated papers for manufacturing decorative boards which are formed by thermal pressing.

b) Description of the Related Art

To manufacture a piece of melamine decorative board, a piece of raw paper with good permeability is colored or printed with patterns, and by impregnating thermosetting resin into the resultant decorative paper, a piece of impregnated paper is obtained. A laminated material is made by placing the piece of impregnated paper on a piece of impregnated kraft paper (kraft paper impregnated with thermosetting resin) and formed by thermal pressing. Finally the laminated material is bonded onto a surface of a base material with an adhesive. The product is known as high pressure melamine decorative board.

Although high quality products can be obtained from this manufacturing process, there are disadvantages. It requires a continuous pressing over a long period of time, i.e., cold pressing, hot pressing and further cold pressing, to laminate the impregnated paper and the impregnated kraft paper. Further, sanding of the adhesive surface is required, and numerous processes are involved. Because of this, in recent years a process has been employed in which an unhardened impregnated decorative paper is directly put together with the base material, and at the same time formed without layering it with the impregnated kraft paper. An example of this is so-called "short cycle" melamine decorative board, and a special fast hardening melamine resin is used. However, it is easy to compromise the characteristics of the surface such as a decrease in luster in the process where water content starts evaporating as steam and escapes from the formed surface. The water is contained in a wooden base material or a piece of impregnated paper, or created by condensation reaction of the thermosetting resin. This occurs because the impregnated resin must be hardened in a short time, and the pressing of the impregnated paper and the base material is done at a quite high temperature. The product is also taken out of the press at a high temperature.

Since this problem is more accentuated where a mirror plate used for pressing which comes in contact with the impregnated paper surface in the press process exhibits high luster, it is common to use a mirror plate whose reflectivity is less than 50% on the surface in manufacturing short cycle melamine decorative boards. Otherwise it is difficult to control the luster and its consistency.

Further, in this manufacturing process, since the thermosetting resin on the reverse side of the impregnated paper or the thermosetting resin absorbed in the impregnated paper is a bonding agent for the wooden base material, a portion of the impregnated resin shifts to the side of the base material during the forming process. At the same time, a portion of the resin on the impregnated paper surface is absorbed, and the amount of hardened resin which is left on the surface at the end of the processes decreases. As a result, abrasion resistance of the decorative paper layer of the product tends to be insufficient. Since the shifting amount of the impregnated resin depends on the properties of the base material surface or those of the impregnated raw paper, the surface physical properties can vary widely.

In order to solve problems stated above in the manufacturing of short cycle melamine decorative boards, the amount of volatile component included in the base material or the impregnated paper is decreased as much as possible (and controlled to about 6%). The amount of thermosetting resin included in the impregnated paper is somewhat increased, and at the same time, the amount of catalyzer within the impregnated resin is also increased. However, the effect is not sufficient, and especially in the latter, heat stability decreases in the forming process and the properties of the surface of the product tend to be poor.

It is an object of the present invention to solve the above-stated problems in decorative board manufacturing in which a sheet of impregnated paper is directly bonded with a base material. The present invention relates to a provision of a decorative board having an excellent abrasion resistance, luster and consistency in the physical properties of the surface.

BRIEF DESCRIPTION OF FIGURES

FIG. 1(*a*) is a plan view of a turntable for the JAS Taber's abrasion test;

FIG. 1(*b*) is a cross-sectional view of the turntable shown in FIG. 1(*a*);

FIG. 2(*a*) is a side view of an abrasion rubber ring;

FIG. 2(*b*) is a cross-sectional view of the abrasion rubber ring shown in FIG. 2(*a*);

FIG. 3(*b*) is an internal view of the spring-type hardness tester;

FIG. 4(*b*) is another side view of the needle and a pressure surface of the spring-type hardness tester;

FIG. 6(*b*) is an enlarged view of a diamond head on the tester shown in FIG. 6(*a*).

THE DETAILED DESCRIPTION OF THE PRESENT INVENTION

Figure 3A:
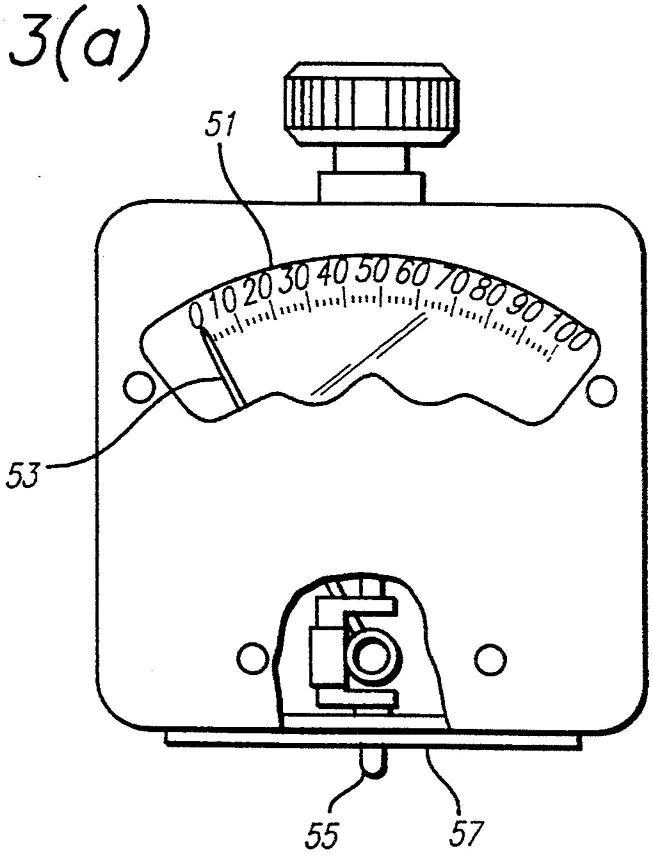
FIG. 3(*a*) is a plan view of a spring-type hardness tester.

The present invention relates to a decorative paper having a thin layer containing a thermosetting resin hardener over the entire front surface thereof. The decorative paper is made from a piece of raw paper having coloring or patterns printed on at least one layer of printing ink on the raw paper. The thin layer containing a thermosetting resin hardener is formed on a layer of printing ink or between printing ink layers, or between layers of printing ink and the raw paper. The present invention provides a decorative paper having characteristics of forming at least one layer of printing ink spread over the entire area, the layer of printing ink containing a thermosetting resin hardener.

The present invention also provides manufacturing methods for manufacturing an impregnated paper made by impregnating any of the above-mentioned decorative papers with thermosetting resin and for manufacturing a decorative board using a piece of impregnated paper.

As stated above, in the impregnated paper of the present invention which uniformly contains thermosetting resin hardener in a surface layer of the decorative paper, thermosetting resin around the layer containing the hardener hardens more rapidly than the resin of other areas due to the effect of the hardener. The resin closer to the surface is prevented from shifting and gives a decorative board excellent surface properties by forming a film of thick hardened resin on the surface. At the same time, the resin layer which rapidly hardens due to the effect of the hardener is formed over the raw paper, and because the thermosetting resin in the paper which is required as an adhesive is not prevented from transferring to the base material from within the raw paper or the back side of the raw paper, adhesive strength between the decorative paper and the base material does not decrease as compared with when no hardener is contained.

The decorative paper of the present invention can be manufactured in the same manner as the conventionally manufactured decorative paper except for the forming process for a layer containing thermosetting resin hardener.

As a raw paper, a piece of paper with a good permeability like the one used for manufacture of impregnated papers can be used. However, with respect to acid hardening type, from the point of view of preservation of the impregnated paper, neutral paper is preferred.

A type of ink used for pad coating of colors or patterns on a piece of raw paper is not limited. It can be of cellulose derivative, polyurethane or acrylic acid resin. Printing can be repeated as many times as desired as in conventional methods.

A thin layer containing a hardener is formed by including a hardener in same medium as an extender used in the ink and coating by pad coating method. Coating can be performed before the printing or after an entire printing process. Further, where there are multiple printing processes, coating can be performed during the printing process, and a layer containing a hardener can be formed as an intermediate layer among the plurality of ink layers.

A thin layer containing the hardener can be combined with a layer of printing ink used for pad coating to form a composite material so that printing is done with an ink containing the hardener.

A hardener is selected according to the type of thermosetting resin for impregnation. Where it is a resin which hardens due to condensation effect like melamine resin and benzoguanamine resin, a latent hardener such as organic acid like acetate, formic acid, etc. or mineral acid like hydrochloride and nitric acid can be used. It can also be ammonium chloride or others. Further, where it is a resin which hardens by radical polymerization such as diallylphthalate and polyester, a compound which promotes a radical reaction such as organic peroxide, etc. is used.

After printing and formation of hardener containing layer, the raw paper is immersed in a solution of desired thermosetting resin, and resin impregnation is performed. The impregnation process continues until the resin solution sufficiently permeates in the raw paper and the layer or layers of printing ink. After that, the processed raw paper is taken out of the resin solution and dried. The resin solution on the front and the back side forms a thin resin film.

The impregnated paper of the present invention provides a decorative board by laminate-forming with a base material in the same way as a short cycle melamine decorative board is manufactured. The latter is made using a conventional impregnated paper.

The first embodiment of the present invention is described herewith.

Pad coating of colored titanium paper weighing 80 grams is conducted using an ink containing a hardener of the following recipe.

| | |
|---|---|
| Cellulose acetate binder varnish ink (white, yellow, brown, mixed color) | 100 weight parts |
| Hardener (Paratoluenesulfonic acid) | 6 weight parts |

Further, a wood pattern is printed by three stage printing of photogravure printing using a cellulose acetate ink.

After the impregnation processing of the resultant printed raw paper in which fast hardening melamine resin (Nissan Chemical K.K. product, M-700) has 60% in amount of resin (impregnated paper weight standard), the impregnated paper of the present invention is obtained by drying at 125° C.

For comparison, a piece of impregnated paper was manufactured the same way as above except a hardener is not added to the ink which is used on the raw paper first.

Next, a decorative board is manufactured using two types of impregnated papers mentioned above. As a base material, a particle board of 15 mm in thickness is used, and a short cycle mirror plate is set for platen press (matt finish). The press condition is as follows.

| | |
|---|---|
| Platen temperature | 180° C. |
| Pressure | 25 kg/cm$^2$ |
| Press time | 60 seconds |

In an abrasion test using Japanese Agriculture and Forestry Standard (JAS) designated Taber's abrasion tester on the resultant decorative board, conventional products lost 50% of the pattern by 50 abrasions, but products according to the present invention had equal to or greater than 50% of the pattern left after 100 abrasions. The JAS Taber's abrasion test which is also known as JAS abrasion A test involves the following. Three test discs of approximately 120 mm diameter are cut out from each sample board and a hole of 10 mm diameter is cut in their respective center.

First, each of the test discs 13 is weighed, and as shown in FIGS. 1(*a*) and 1(*b*), it is fixed horizontally onto a turntable with a test disc fixture 5. The turntable has two rubber dishes or soft abrasion rings 1, which are wrapped with abrasive papers and have a plug 7 and screws 11. The figures used in FIGS. 1(*a*) and 1(*b*) are in mm. The abrasive papers and the rubber dishes 1 must meet the standard set in the Testing Method for Laminated Thermosetting Decorative Sheets (JIS K 6902(1963)) as follows.

The rubber dish 1 shown in FIGS. 2(*a*) and 2(*b*) has a thickness of 12.7 mm and the outside radius is 50.6 mm. An interior ring portion 10 is hard rubber having approximately 40 kg/mm$^2$ in Vickers hardness or its equivalents. The axis hole radius is $15.9_{-0.04}^{0}$ mm.

Figure 3B:
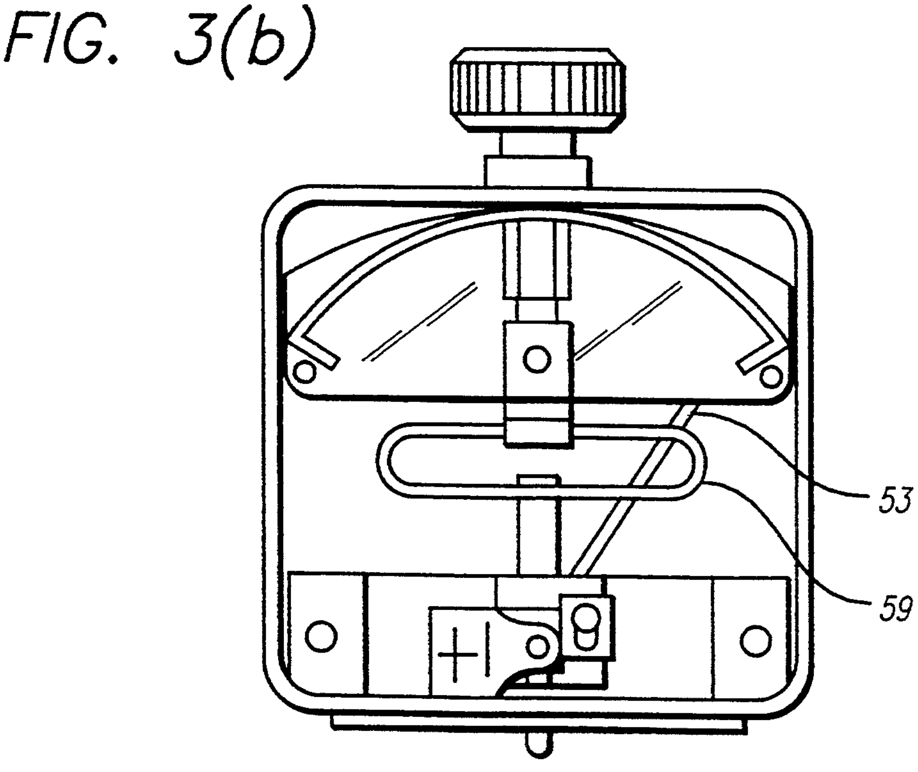
Figure 4A:
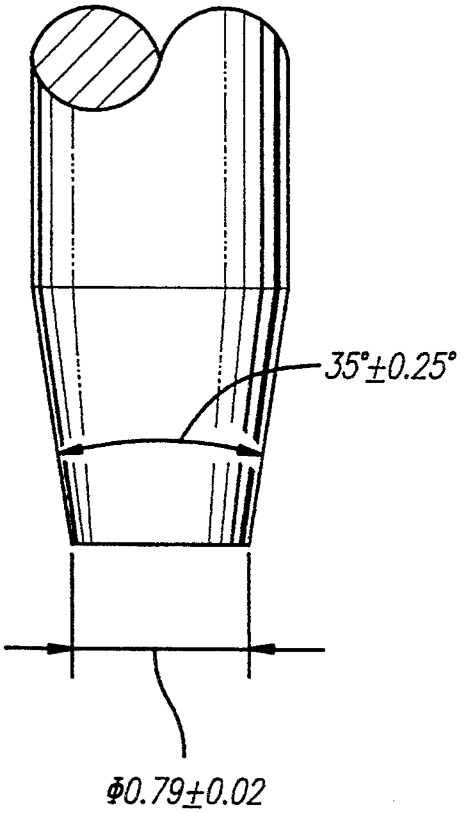
FIG. 4(*a*) is an enlarged view of the tip of the needle of the spring-type hardness tester.
Figure 4B:
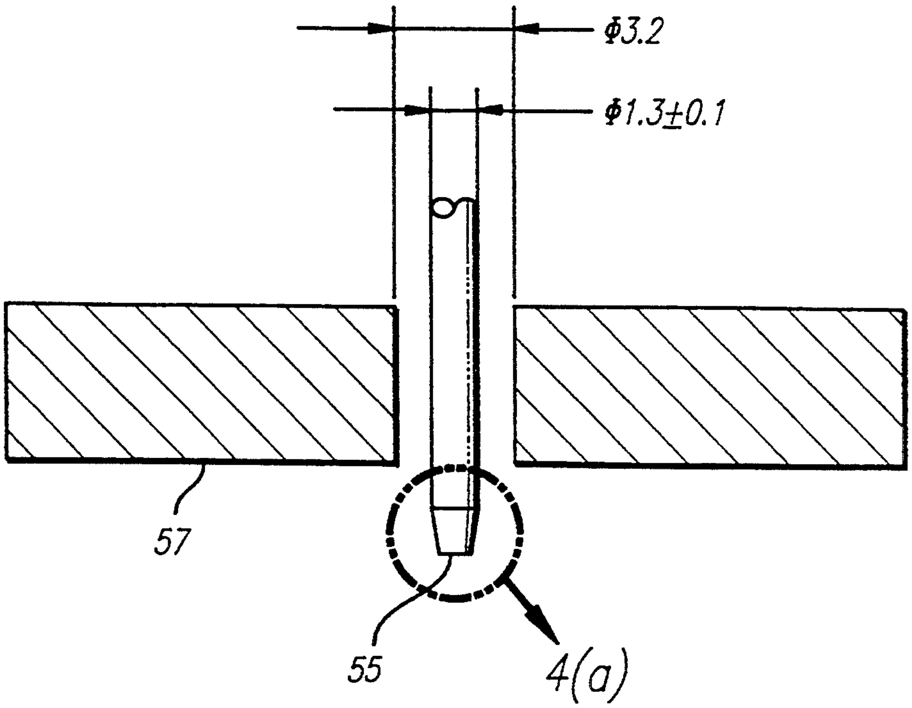
Figure 5:
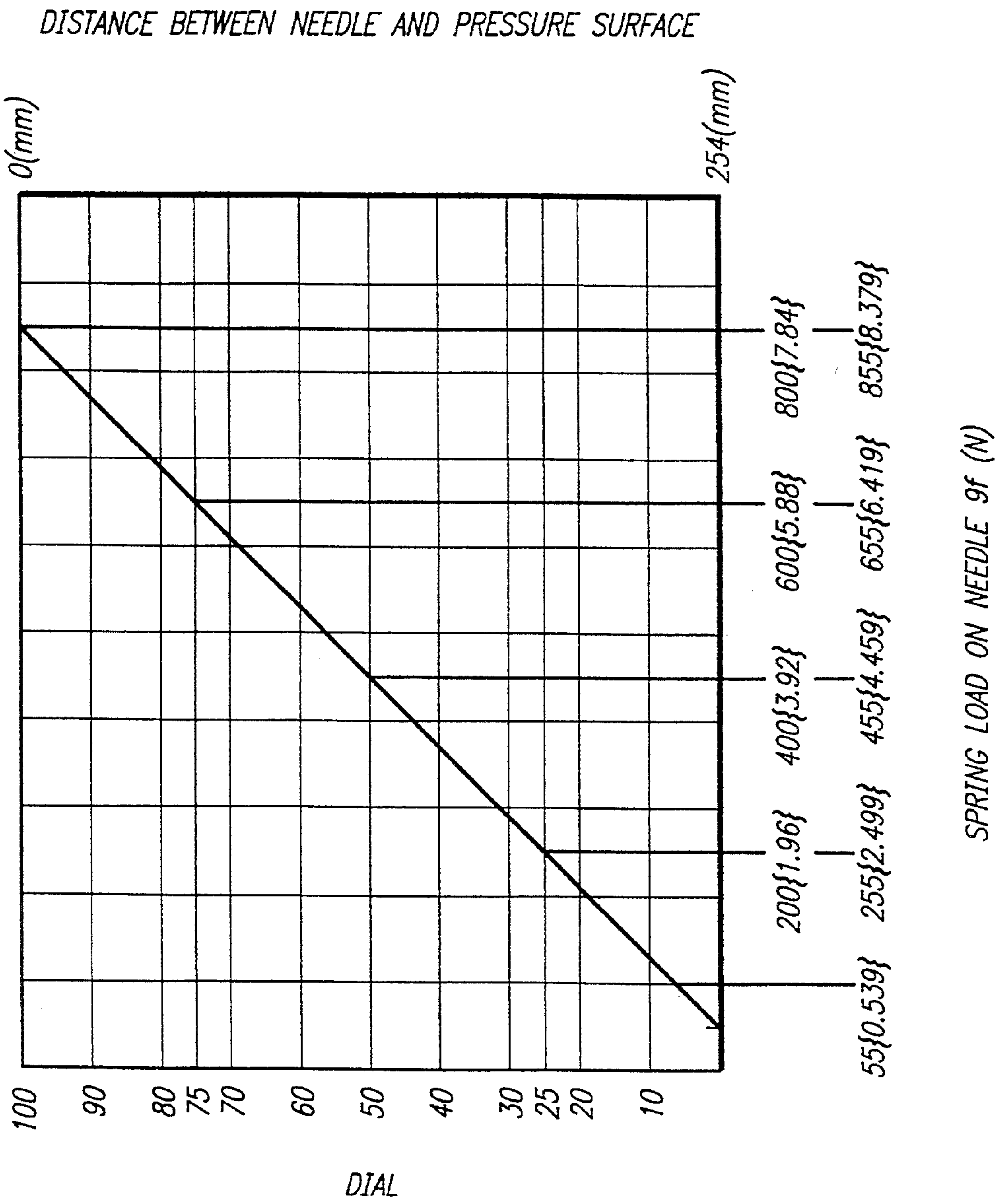
FIG. 5 is a table showing a standard line between the dial 51 and the load on the needle 53 placed by a spring 59.

An exterior ring portion 9 having a 6 mm thickness is rubber having spring hardness 50 to 60 according to Japanese Industrial Standard ("JIS") K 6301 (physical testing method for vulcanized rubber). The spring-type hardness test involves a testing machine as shown in FIG. 3(*a*) having a dial 51, an arm 53, a needle 55, and a pressure surface 57. The inside view is also shown in FIG. 3(*b*). An enlarged tip of the needle 53 is shown in FIGS. 4(*a*) and 4(*b*). This testing machine shows on the dial 51 the hardness of the test piece surface by the distance that the rubber surface is pushed back by the needle 55 protruding from the central hole of the pressure surface 57 by the pressure of a spring 59 when the test piece is placed on the pressure surface 57. The testing machine is maintained vertically, and the pressure surface 57 is made to touch the surface of the test piece so that the needle 53 is perpendicular to the test surface. The dial 51 is read immediately thereafter to obtain the hardness of the the test piece. If the dial 51 is read after a certain amount of time after the test piece is placed against the pressure surface 57, it is desirable to use an appropriate supporting equipment to maintain the machine vertically and the needle 55 perpendicular to the test surface. In that case, the test machine is loaded vertically with 1000 gf (9.81N) and the dial 51 is read in this condition. FIG. 5 is a table showing a standard line between the dial 51 (degree) (distance between the pressure surface 57 and the needle tip) and the load on the needle 53 placed by a spring 59 (gf[N]).

The abrasion paper is of a type using molten alumina as an abraser (AA 180 of JIS R 6252) or its equivalent, and is 159 mm in length and 12.7 mm in width.

When the abrasion reaches the abrasion finishing point as defined below, the number of revolutions is read, the weight has been measured, and the abrasion value and abrasion amount are obtained. In this case, the total load on the test piece is set at 500 g, including the weight of the rubber dishes.

The value of abrasion and the amount of abrasion are calculated according to the following equations.

Value of Abrasion=(total number of revolutions of all test pieces)/3

Amount of Abrasion (g)=$(W/C)\times 100$ where W is the average of the weight decreased in three test pieces, and C is the Value of Abrasion.

The abrasion finishing point is when the pattern is 50% gone where there is pattern on the decorative side of the test piece, or when the underlying material is approximately 50% gone where the decorative side is plain.

Further, a scratch hardness test conforming to the JAS designated A test, hereinafter called "the JAS scratch A test," was performed on the two types of decorative boards as mentioned above, the depth of the scratch mark in the conventional products reached 4μ as compared with products using the present invention whose value reached 1μ, and with the latter, a hardness comparable to high pressure melamine decorative board was confirmed.

Figure 6A:
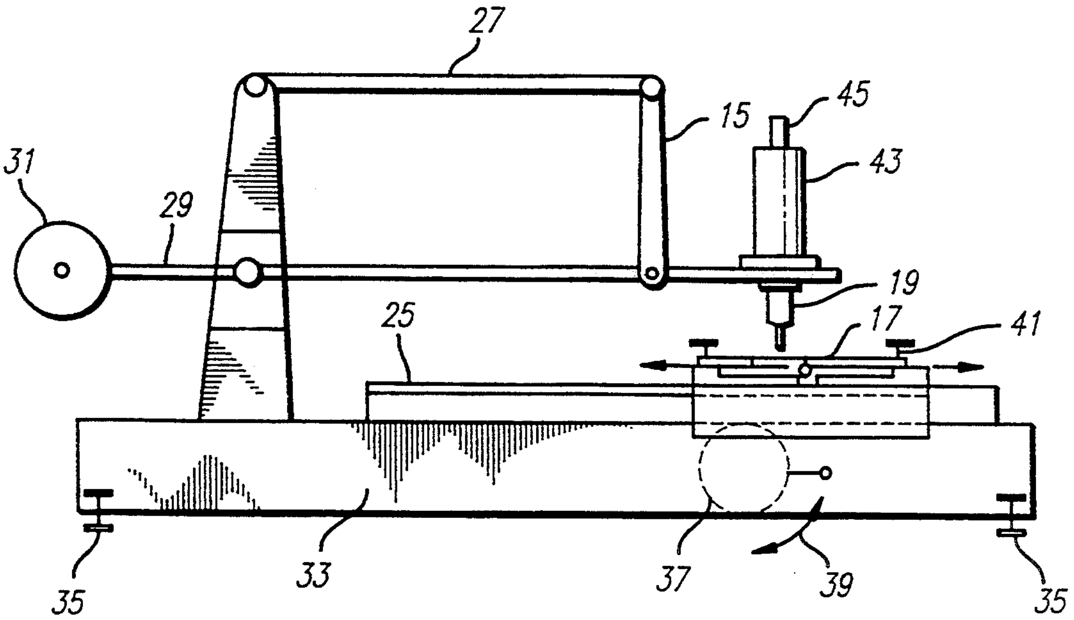
FIG. 6(*a*) is a side view of the JAS scratch A tester.
Figure 6B:
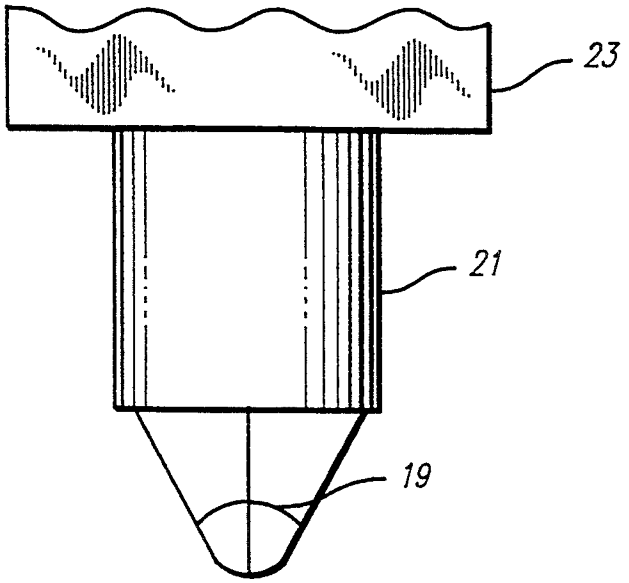

The JAS scratch A test requires two testing pieces from a sample board, which are rectangular in shape and have dimensions of 90 mm horizontally in the direction of the main fiber on the surface board of a support board and 170 mm diagonal thereto. The test piece is fixed horizontally onto a platform 17 as shown in FIG. 6(*a*) and receives a 200 g load using a diamond needle 19 shown in FIGS. 6(*a*) and 6(*b*). The diamond needle 19 has a 45° angle and R5/100 mm, and is held by a diamond needle holder 21 and its holder 23. The diamond needle 19 is shown having a weight 43 and an axis 45. The test equipment itself is provided with a connector 15, beams 27 and 29, a weight 31, a base 33, and adjustment legs 35. The base 33 holds a transfer gear 37 having a handle 39, and the platform is equipped with a fixture 41 to hold the test piece as well as a guide 25. Three lines of linear scratches of 50 mm length are made on the surface. The average of the scratch depths of the test pieces must be equal to or less than 10μ.

A second embodiment of the present invention is described below.

A pad coating on white titanium paper of 80 grams in weight is performed using a beige cellulose acetate ink, and another pad coating is performed on it using a pearlescent ink containing pearl silver Iriodin 103 (product of Merck Inc. of W. Germany, mica surface is special-processed with titanium oxide). Subsequently, a varnish containing a hardener with a following recipe is used to coat the printed surface.

| | |
|---|---|
| Cellulose acetate binder varnish ink | 100 weight parts |
| Hardener (paratoluenesulfonic acid) | 6 weight parts |

The resultant decorative paper is impregnated so that a rapid hardening melamine resin (Nissan chemical product N-700) is 60% in amount of resin (impregnated paper weight standard), and the impregnated paper of the present invention is obtained by drying it for two minutes at 125° C.

For comparison, other than not adding a hardener to the varnish which is used for coating in the last process of the decorative paper manufacturing, the impregnated paper was manufactured in the same way as above.

Next, a decorative board is manufactured using two types of impregnated papers as stated above. As a base material, a particle board of 15 mm in thickness is used, and a short cycle mirror plate is set for the platen press (gloss finish). The press condition is as follows.

| | |
|---|---|
| Platen temperature | 180° C. |
| Pressure | 25 kg/cm$^2$ |
| Press time | 60 seconds |

When visible light reflectivity of the surface was measured using a glossmeter of 60° incidence and 60° photometry on the resultant decorative board, a product using the conventional method exhibited 93%, whereas a product using the present invention exhibited 105%. Further, the luster of the surface differed in that the product using the present invention had more brightness and depth.

Yet another embodiment of the present invention is described below.

In printing a piece of decorative paper for a short cycle melamine decorative board, etc., it is common to repeatedly pad coat to prevent printing inconsistencies where printing is done with one color such as ivory. In this embodiment, in manufacturing a piece of ivory pad-coated decorative paper, a sheet of white titanium paper (weight 100 g/m$^2$) is printed by multi-layered printing, and a thin layer of varnish containing the hardener used in the second embodiment is employed between layers for pad coating. The resultant decorative paper is processed for impregnation so that the fast hardening melamine resin (Nissan Chemical K.K. product, M-700) is 56% in amount of resin (impregnated paper weight standard), and the impregnated paper of the present invention is obtained by drying it for two minutes at 125° C.

For comparison, other than not adding a hardener to the varnish, the impregnated paper is manufactured in the same way as above.

Next, a board is manufactured using the two types of impregnated papers as stated above. A particle board of 15 mm in thickness is employed as a base material, and a mirror plate used for matt finish is employed for the press. The press condition is as follows.

| | |
|---|---|
| Platen temperature | 180° C. |
| Pressure | 25 $kg/cm^2$ |
| Press time | 60 seconds |

When an abrasion test as prescribed by JAS was performed on the resultant decorative board, conventional products lost 50% of the pattern after 80 abrasions, whereas products of the present invention maintained equal to or greater than 50% of the pad-coated pattern after 160 abrasions, thereby confirming a durability capable of use as a desk board.

Further, when a pollution test according to JAS rules was performed on the decorative boards of the above two types, conventional products failed the test due to clerical blue ink pollution, whereas products of the present invention had no noticeable pollution and exhibited excellent surface properties.

As stated above, in decorative board manufacturing using the impregnated paper of the present invention, which uniformly contains a thermosetting resin hardener on the surface of a sheet of decorative paper, the fluidity decreases when the thermosetting resin lightly hardens around the printed layer where the hardener is distributed. The resin further forms a thick hardened film on the surface without being absorbed in the raw paper since it hardens faster than the resin within the raw paper when the impregnated paper and the base material are layered together and formed by thermal pressing. Accordingly, a decorative board is readily obtained with excellent surface properties including high abrasion resistance. Further, when the surface resin film thickens, the depth of the decorative paper pattern observed through the film increases. Particularly, on the decorative paper printed with an ink containing pearlescent paint, the undesirable properties of the pearlescent paint accompanying the flow of the resin in the forming process is controlled, and an excellent external appearance with luster and more brightness can be obtained.

I claim:

1. A decorative material comprising:
a sheet of substrate paper;
a layer of printing ink having a first side and a second side and containing thermosetting resin, the second side facing the sheet of substrate paper; and
a layer coating the first side of the layer of printing ink and having approximately 100 weight part varnish and approximately 6 weight part thermosetting resin hardener so that a value of at least 94% is obtained in a glossmeter measurement using a glossmeter of 60° incidence and 60° photometry when the laminated material is disposed in a base material.

2. A decorative material comprising:
a sheet of substrate paper;
a layer of printing ink for providing a print pattern; and
a layer having substantially 100 weight part varnish ink and substantially 6 weight part resin hardener disposed between the sheet of substrate paper and the layer of printing ink so that at least 50% of the print pattern remains in the decorative material after approximately 100 abrasions in JAS Taber's abrasion test performed on the laminated material coupled to a base material, wherein the layer of printing ink includes a thermosetting resin and a thermosetting resin hardener.

* * * * *